United States Patent [19]
Rockstroh

[11] Patent Number: 6,130,400
[45] Date of Patent: Oct. 10, 2000

[54] BALLISTIC MOMENTUM APPARATUS AND METHOD FOR MONITORING AND CONTROLLING LASER SHOCK PEENING

[75] Inventor: Todd J. Rockstroh, Maineville, Ohio

[73] Assignee: General Electric Company, Cincinnati, Ohio

[21] Appl. No.: 09/105,686

[22] Filed: Jun. 26, 1998

[51] Int. Cl.[7] .................................................. B23K 26/00
[52] U.S. Cl. .................. 219/121.6; 219/121.68; 219/121.69; 219/121.85; 148/903
[58] Field of Search .......................... 219/121.6, 121.61, 219/121.66, 121.85, 121.73, 121.65, 121.68, 121.69, 121.83, 121.78, 121.81; 148/903; 72/53

[56] References Cited

U.S. PATENT DOCUMENTS

| | | |
|---|---|---|
| 2,407,278 | 9/1946 | Hodges . |
| 2,620,838 | 12/1952 | Huyett et al. ........................... 144/297 |
| 3,354,559 | 11/1967 | Beck . |
| 3,469,087 | 9/1969 | Seaton . |
| 4,470,292 | 9/1984 | DeClark et al. . |
| 4,937,421 | 6/1990 | Ortiz, Jr. et al. . |
| 5,046,352 | 9/1991 | Kingery et al. ........................... 73/4 R |
| 5,195,357 | 3/1993 | Takino et al. ................................. 73/9 |
| 5,492,447 | 2/1996 | Mannava et al. . |
| 5,591,009 | 1/1997 | Mannava et al. . |
| 5,674,328 | 10/1997 | Mannava et al. . |
| 5,674,329 | 10/1997 | Mannava et al. . |
| 5,675,892 | 10/1997 | Mannava et al. . |
| 5,728,969 | 3/1998 | Otani et al. . |
| 5,730,811 | 3/1998 | Azad et al. .............................. 148/565 |
| 5,735,044 | 4/1998 | Ferrigno et al. . |
| 5,741,559 | 4/1998 | Dulaney . |
| 5,744,781 | 4/1998 | Yeaton ............................... 219/121.84 |
| 5,974,889 | 11/1999 | Trantow ..................................... 73/624 |
| 5,980,101 | 11/1999 | Unternahrer et al. ..................... 374/32 |
| 5,987,991 | 11/1999 | Trantow et al. ........................... 73/624 |

FOREIGN PATENT DOCUMENTS 1225763  3/1971  United Kingdom .

OTHER PUBLICATIONS

"Laser shocking extends fatigue life", Laser Technology, in American Machinist, by John A. Vaccari, Jul. 1992, pp. 62–64.

"Laser Shock Processing Increases the Fatigue Life of Metal Parts", in Materials and Processing Report, Sep. 1991, pp. 3–5.

"Ballistic Pendulum", http://hyperphysics.phyastr.gsu.edu/balpen.html, Jun. 4, 1998, 1 page.

"Ballistic Pendulum", http://webug.physics.uiuc.edu/cour . ... all97/Lectures/Lect14sw/sld021.htm, Jun. 4, 1998, 1 page.

"Experiment 13: The Ballistic Pendulum", http://www.rm-c.edu/academic/depart . . . ys/Lab_Manual/ballpen/ballpen.html, Jun. 4, 1998, 3 pages.

"The Ballistic Pendulum", http://www.science.urich.edu/~rubin/pedagogy/131/131labs/projectile.html, Jun. 4, 1998, 2 pages.

"PIRA 1M40.40—Conservation of Energy: Ballistic Pendulum", http://storm.ph.utexas.edu/~phy–demo/demo–txt/1m40–40.html, Jun. 4, 1998, 2 pages.

*Primary Examiner*—Patrick Ryan
*Assistant Examiner*—M. Alexandra Elve
*Attorney, Agent, or Firm*—Andrew C. Hess; Gerry S. Gressel

[57] ABSTRACT

A method for quality assurance of a laser process and, more particularly, a laser shock peening process that uses a ballistic momentum apparatus for maintaining quality control of a laser shock peening process that uses a laser includes a movable target mass having a laser target face and confined to freely move in one direction. An indicating means indicates a maximum distance traversed by the target mass during a recoil from firing of the laser on the target face. An ablative coating is preferably applied on at least a portion of the face and preferably a transparent confinement medium, such as a flow of water, is applied over the ablative coating.

20 Claims, 4 Drawing Sheets

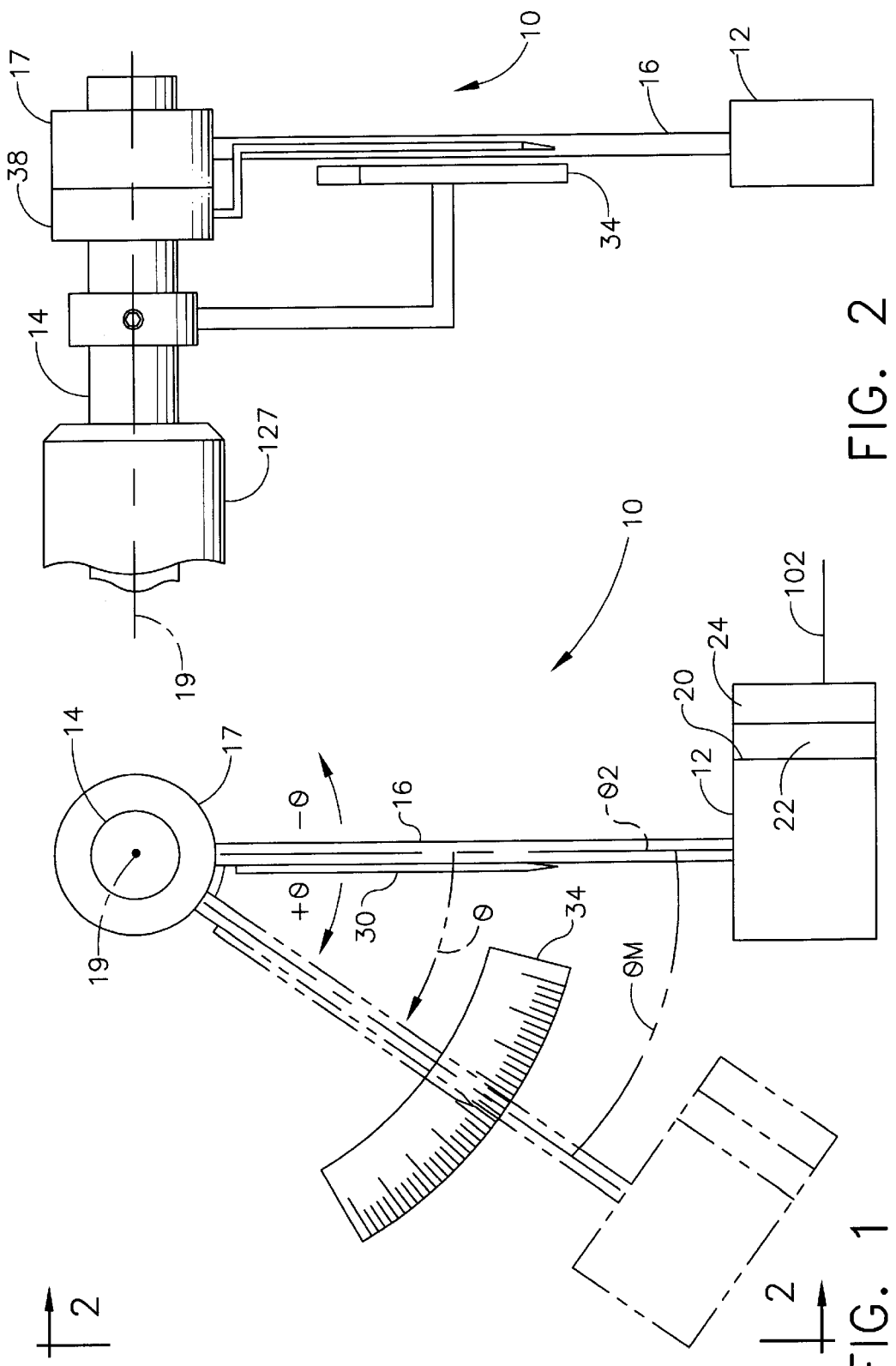

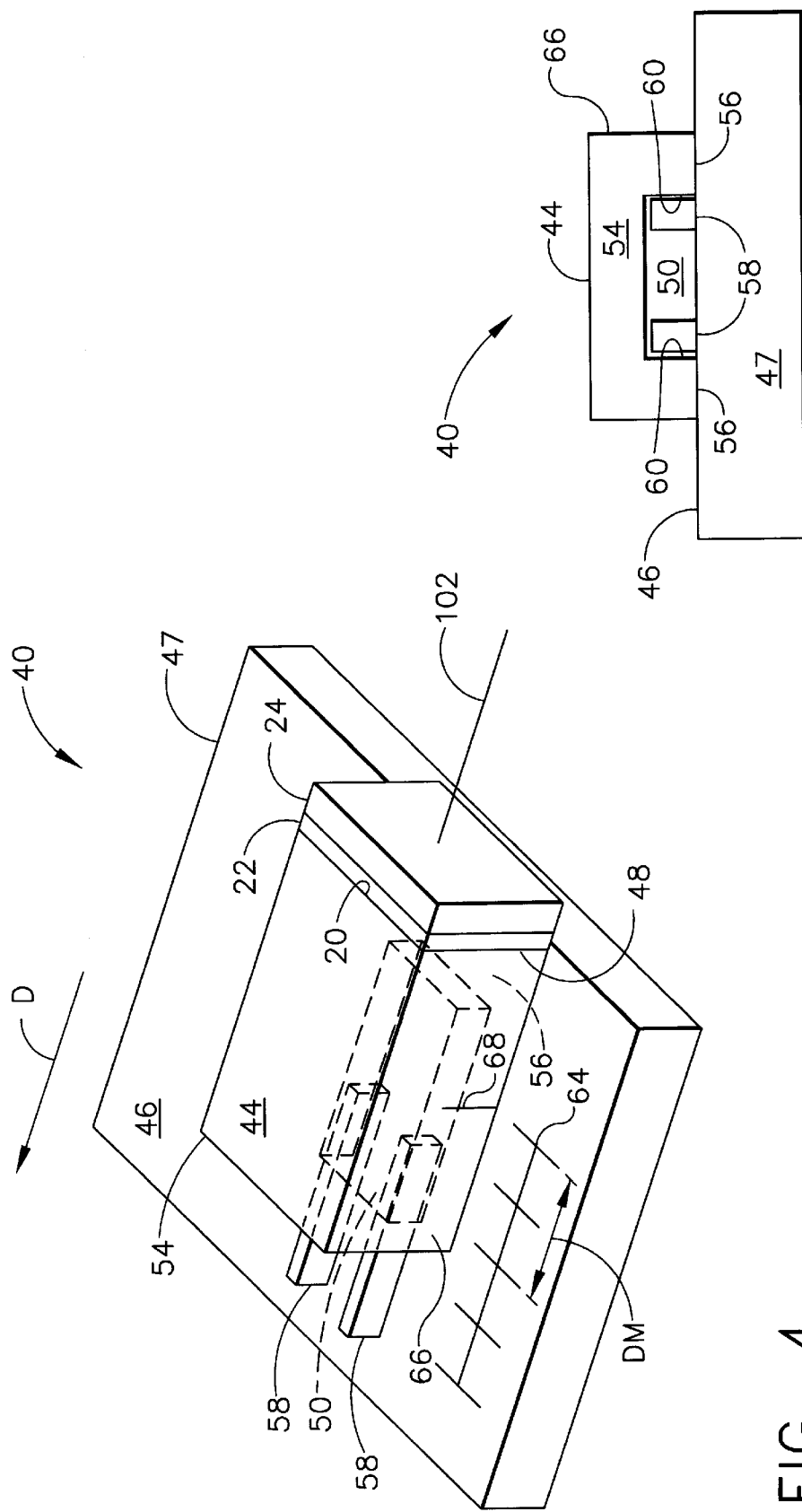

BALLISTIC MOMENTUM APPARATUS AND METHOD FOR MONITORING AND CONTROLLING LASER SHOCK PEENING

BACKGROUND OF THE INVENTION

1. Field of the Invention

This invention relates to quality assurance methods and apparatus used for quality assurance of laser surface treatment of a substrate surface and, more particularly, for use of a ballistic momentum apparatus, such as a ballistic pendulum, for quality assurance of laser shock peening.

2. Description of Related Art

Laser shock peening or laser shock processing, as it is also referred to, is a process for producing a region of deep compressive residual stresses imparted by laser shock peening a surface area of a workpiece. Laser shock peening typically uses one or more radiation pulses from high power pulsed lasers to produce shock waves on the surface of a workpiece similar to methods disclosed in U.S. Pat. No. 3,850,698, entitled "Altering Material Properties"; U.S. Pat. No. 4,401,477, entitled "Laser Shock Processing"; and U.S. Pat. No. 5,131,957, entitled "Material Properties". Laser shock peening, as understood in the art and as used herein, means utilizing a pulsed laser beam from a laser beam source to produce a strong localized compressive force on a portion of a surface by producing an explosive force by instantaneous ablation or vaporization of a painted or coated or uncoated surface. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method". These methods typically employ a curtain of water flowed over the workpiece or some other method to provide a confining medium to confine and redirect the process generated shock waves into the bulk of the material of a component being LSP'd to create the beneficial compressive residual stresses.

Laser shock peening is being developed for many applications in the gas turbine engine field, some of which are disclosed in the following co-pending U.S. patent application Ser. No.: 08/362,362 entitled "ON THE FLY LASER SHOCK PEENING", filed Dec. 22, 1994; and U.S. Pat. Nos.: 5,591,009, entitled "Laser shock peened gas turbine engine fan blade edges"; 5,569,018, entitled "Technique to prevent or divert cracks"; 5,531,570, entitled "Distortion control for laser shock peened gas turbine engine compressor blade edges"; 5,492,447, entitled "Laser shock peened rotor components for turbomachinery"; 5,674,329, entitled "Adhesive tape covered laser shock peening"; and 5,674,328, entitled "Dry tape covered laser shock peening", all of which are assigned to the present Assignee. These applications, as well as others, are in need of efficient quality assurance testing during production runs using laser shock peening.

Laser shock peening processes have been developed to simultaneously LSP pressure and suction sides of leading and trailing edges of fan and compressor airfoils and blades as disclosed in U.S. Pat. No. 5,591,009 entitled "Laser shock peened gas turbine engine fan blade edges" and U.S. Pat. No. 5,531,570 entitled "Distortion control for laser shock peened gas turbine engine compressor blade edges". Single sided shot peened Almen strips are well known for use in the field of shot peening quality control, see U.S. Pat. No. 2,620,838. However, Almen strips do not work with a single laser beam hit. The LSP process involves the use of high pulse energy, short pulse duration laser systems. The combination of high energy and short duration limit the usefulness of electronic measurement systems to verify the true (calibrated) energy being delivered to the component being processed.

Conventional high cycle fatigue (HCF) testing of blades which are LSP'd and notched before testing has been tried as a quality assurance technique. Measurement of the diameter and volume of a single LSP spot on a flat coupon by optical interferometry has also been tried for QA purposes. Both of these methods are fairly expensive and time consuming to carry out and significantly slows production and the process of qualifying LSP'd components. An improved quality assurance apparatus and method of measurement and control of LSP is required which is inexpensive, accurate, repeatable, and quick. LSP is a process that, as any production technique, involves machinery and is time consuming and expensive. Therefore, any technique that can reduce the amount or complexity of production machinery and/or production time are highly desirable. According to U.S. Pat. No. 3,469,087, the prior art in the area of measuring the output of lasers includes classical devices such as bolometers, photoelectric sensors, and in one instance, a ballistic pendulum. Ballistic pendulums are well known in the area of physics and in the field of explosive testing as indicated in U.S. Pat. No. 5,728,969. Ballistic pendulums are one form of ballistic momentum apparatus of the present invention which have target masses designed to absorb the force of an impact and explosion, dissipate the imparted momentum, and use the dissipated momentum to indicate the force of the explosion or impact. The ballistic pendulums use gravity to counter and dissipate the momentum such that the momentum of the mass is brought to 0 at the maximum distance of travel of the mass. Linear horizontal ballistic momentum apparatus have horizontally translatable masses that work against a resistance force producing device such as a spring or frictional contact.

SUMMARY OF THE INVENTION

A ballistic momentum apparatus for maintaining quality control of a laser shock peening process that uses a laser includes a movable target mass having a laser target face and confined to freely move in one direction. The apparatus includes an indicating means to indicate a maximum distance traversed by the target mass during a recoil from firing of the laser on the target face. The target mass preferably includes an ablative coating applied on at least a portion of the target face and, preferably, further includes a transparent confinement medium applied over the ablative coating. The transparent confinement medium may be a transparent fluid curtain such as a flow of water. The ablative coating may be a paint or a black plastic tape. The transparent confinement medium may also be a transparent plastic coating such as a transparent plastic layer of the tape which may be an adhesive tape.

One preferred embodiment of the apparatus is a ballistic pendulum having a support from which the target mass is suspended by a suspension that allows the target mass to freely move along an arc against gravity in a circular or angular direction. The suspension may include a free swinging suspension arm pivotably suspended at a top end of the suspension arm from the support and the target mass is attached to a bottom end of the suspension arm such that the suspension arm is confined to move freely in an angular direction through an angular distance. The indicating means may include a follower arm pivotably suspended from the support and engageable by the suspension arm only in an upward angular direction of the suspension arm. Correspondingly, the target mass would move in an upward angular direction from a target mass bottom resting angular position to a target mass upper angular position. An angular scale may be operably located to measure an angular position of the follower arm and indicate the angular distance. The follower arm may be pivotably suspended from the support with a clutch bearing that causes the follower arm to engage the suspension arm only when the suspension arm moves in the upward angular direction and disengage from the suspension arm to remain stationary when the suspension arm moves in a downward angular direction.

An alternative embodiment of the apparatus includes the target mass resting on a flat horizontal surface and confined to freely move on the flat horizontal surface only in a linear direction.

A method of quality control for a laser shock peening process includes the mounting of the ballistic momentum apparatus in a laser shock peening system used for the laser shock peening process, striking the face of the target mass of the ballistic momentum apparatus with a laser of the laser shock peening system causing the mass to move through a distance, and recording the maximum distance the target mass has moved in response to the striking of the face with the laser. The method preferably includes a further step that compares the recorded maximum distance to a predetermined correlation of a maximum distance indicating parameter and high cycle fatigue failure of a high cycle fatigue test workpiece related to production workpieces undergoing the laser shock peening process. The correlation may be obtained by comparing results of at least one test firing of the laser on the mass near in time to a laser shock peening of at least one test workpiece and then performing high cycle fatigue testing on the test workpiece after it has been laser shock peened. The test workpiece is preferably laser shock peened the same way as the production workpieces.

In one exemplary embodiment, the production workpieces are gas turbine engine blades having airfoils and the test workpiece is a gas turbine engine blade having an airfoil with a notch in a laser shock peened patch of the airfoil wherein the notch is formed after the airfoil has been laser shock peened.

ADVANTAGES

Advantages of the present invention are numerous and include lowering the cost, time, man power and complexity of performing quality assurance tests during laser shock peening processes. Another advantage of the present invention is that it allows performing quality assurance tests during laser shock peening processes at the site of the process and in real time with respect to the processing. The present invention can help greatly reduce the amount of down time for performing quality assurance tests during laser shock peening. The present invention replaces the tedious, costly and time consuming process of notched high cycle fatigue testing presently used for QA. The QA can be performed in tandem with an actual component or workpiece and is highly repeatable and, thus, very dependable as a QA process for laser shock peening.

The present invention has several other manufacturing advantages including measuring the laser energy at the component not raw energy of the laser prior to the beam passing through focusing and beam steering optics that lose energy. The present invention quickly measures the true energy transferred to the component, in effect, the transport phenomena of the LSP process, not the raw laser energy, which can be significantly different. The pendulum can be located near the processing location and be utilized frequently with real time results. The present invention provides a very dependable QA process due in a great part to its repeatability.

BRIEF DESCRIPTION OF THE DRAWINGS

The foregoing aspects and other features of the invention are explained in the following description, taken in connection with the accompanying drawings where:

FIG. 1 is an elevational front view of a ballistic momentum apparatus in the form of a ballistic pendulum apparatus in accordance with an exemplary embodiment of the present invention.

FIG. 2 is an elevational side view of the ballistic pendulum apparatus illustrated in the direction of 2—2 in FIG. 1.

FIG. 4 is a perspective view illustration of a linear ballistic momentum apparatus illustrated in accordance with an alternative embodiment of the present invention.

FIG. 5 is a side view of the linear ballistic momentum apparatus illustrated in FIG. 4.

DETAILED DESCRIPTION OF THE INVENTION

Figure 3:
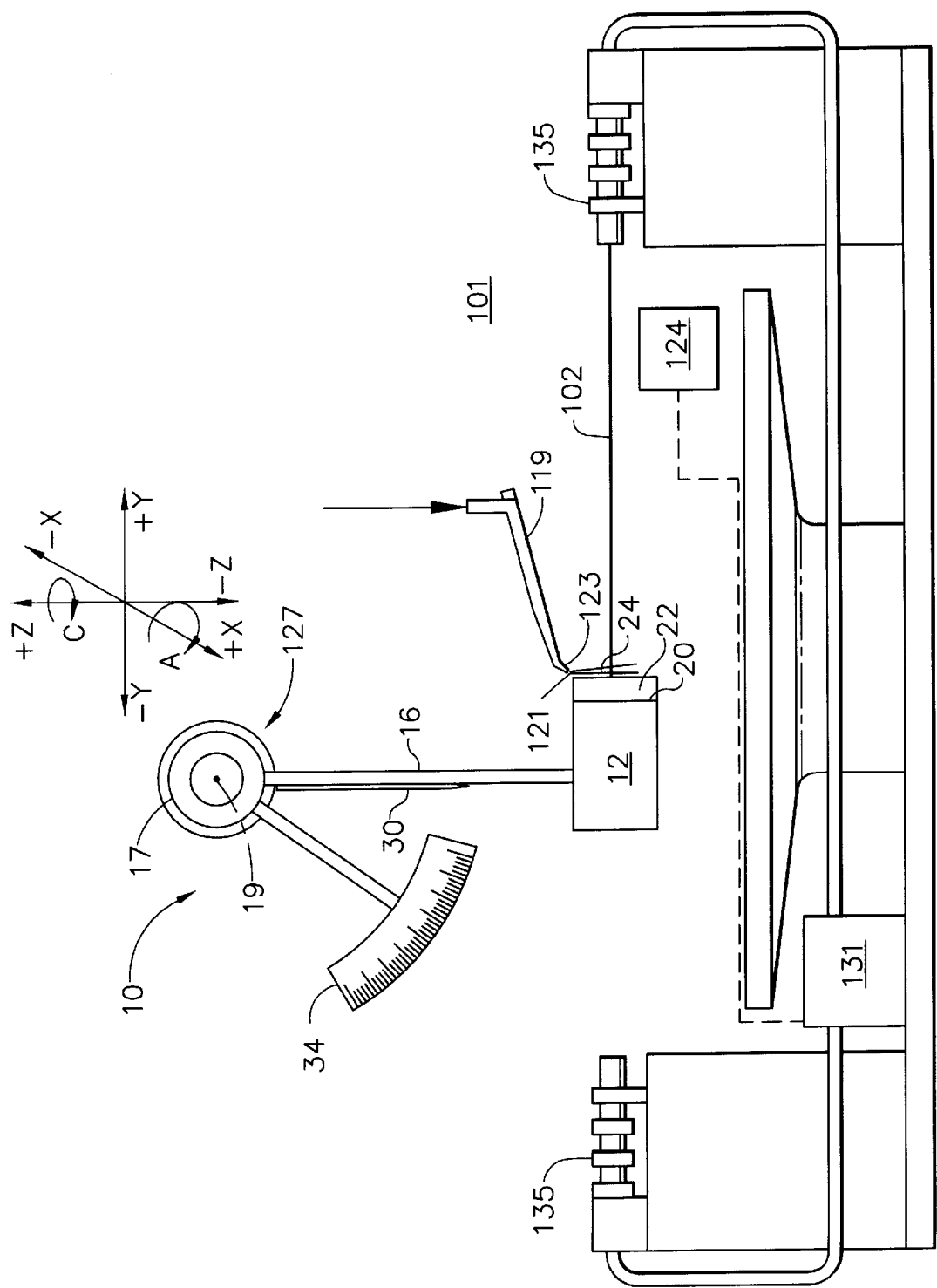
FIG. 3 is a schematic perspective view illustration of the ballistic pendulum apparatus in FIG. 1 mounted in a laser shock peening system in accordance with an exemplary use of the present invention for a quality assurance inspection.

Illustrated in FIGS. 1 and 2 is a schematic representation of first exemplary embodiment of a ballistic momentum apparatus of the present invention, in the form of a ballistic pendulum 10, used in a method for quality assurance of a laser process and, more particularly, a laser shock peening process in accordance with the present invention. The ballistic pendulum 10 includes a freely movable metallic target mass in the form of a bob 12 connected to a support in the form of a cylindrical spindle 14 by a suspension, in the form of a freely pivotable suspension arm 16, that constrains the target mass or bob to freely move or rotate in an angular direction θ about a pivot axis 19 of the spindle. At one distal end of the suspension arm 16 is a hub 17 rotatably mounted on the spindle 14 of the bob 12 is attached to another distal end of the suspension arm. A laser target face 20 on the bob 12 preferably includes an ablative coating 22 applied on at least a portion of the face and preferably further includes a transparent confinement medium 24 applied over the ablative coating.

The ballistic momentum apparatus preferably also includes an indicating means to indicate a distance traversed by the target mass or bob 12 during a recoil from firing of a laser on the target face 20. The ballistic pendulum 10 of the present invention provides such an indicating means in the form of a follower arm 30 suspended from the spindle 14 so as to be pivotable about the pivot axis 19. The follower arm 30 is positioned and pivotably mounted to the spindle 14 so as to be engaged by the suspension arm 16 only in an upward angular direction +θ of the suspension arm. This corresponds to an upward angular movement of the bob 12 from a bob bottom resting angular position θ2=0 to a bob maximum angular distance θM. An angular scale 34 is operably located to measure the angular position of the follower arm 30 and indicate the maximum angular distance θM the bob traversed due to the recoil from a single hit of a laser beam 102 used for laser shock peening (illustrated in FIG. 3). The follower arm 30 is pivotably suspended from the spindle 14 with a rotatable hub and clutch bearing 38 that causes the follower arm 30 to engage the suspension arm 16 only when the suspension arm moves in the upward angular direction +θ and disengage from the suspension arm to remain stationary when the suspension arm moves in a downward angular direction −θ.

Illustrated in FIG. 3 is the ballistic pendulum 10 mounted operably positioned in a laser shock peening system 101 used for laser shock peening workpieces such as blades 108 described below. The spindle 14 of the ballistic pendulum 10 is attached to a five-axis computer numerically controlled (CNC) manipulator 127, commercially available from the Huffman Corporation, having an office at 1050 Huffman Way, Clover, S.C. 29710. The five axes of motion that are illustrated in the exemplary embodiment are conventional translational axes X, Y, and Z, and conventional rotational axes A and C that are well known in CNC machining. The manipulator 127 is preferably used to move and position the ballistic pendulum 10 for a QA procedure as well as workpieces to effect laser shock peening "on the fly" in accordance with a laser shock peening method and of the present invention. The manipulator 127 is used to position the ballistic pendulum 10 to face a laser beams 102 from either of the two optics 135 which include optical elements that transmit and focus the laser beam 102 on the workpiece and the ballistic pendulum 10. The ablative coating 22 on the laser target face 20 should be same as that used for the laser shock peening of the workpieces. The ablative coating 22 may be applied in a number of various ways using paint or tape as an ablative medium (see—in particular U.S. Pat. No. 5,674,329 entitled "Adhesive Tape Covered Laser Shock Peening"). The confinement medium 24 is preferably a transparent fluid curtain such as a flow of water. A transparent layer of clear plastic may be used on tape or the process may be performed without the confinement medium 24.

Each of the laser beams 102 is preferably fired through a curtain of flowing water 121 that is flowed over the target face 20 coated with the ablative coating 22. The paint, tape, or other ablative coating 22 is ablated generating plasma which results in shock waves on the target face 20. This also causes ablated material from the ablative coating 22 to be expelled in an explosive manner away from the target face 20 resulting in a recoil of the target mass such as the bob 12. It is the force of this recoil which the present invention measures in the form of the traversed distance which is used as an indicator in the quality assurance test of the present invention. Other ablative materials may be used to coat the surface as suitable alternatives to paint. These coating materials include metallic foil or adhesive plastic tape as disclosed in U.S. Pat. Nos. 5,674,329 and 5,674,328.

The curtain of water 121 is illustrated as being supplied by a conventional water nozzle 123 at the end of a conventional water supply tube 119. A controller 124 may be used to modulate and control the laser shock peening system 101 to fire the laser beams 102 on the target face 20 in a controlled manner. Ablated coating material is washed out by the curtain of flowing water 121.

Illustrated in FIGS. 4 and 5 is alternative embodiment of the ballistic momentum apparatus in the form of a linear ballistic momentum apparatus 40 in which the target mass is illustrated in the form of a rectangular block 44 slideably disposed on a flat horizontal surface 46 of a base 47 and confined to freely move on the flat horizontal surface only in a linear direction D. The laser target face 20 is disposed on a first end 48 of the block 44 and the ablative coating 22 is applied on at least a portion of the face and the transparent confinement medium 24 is preferably applied over the ablative coating. A rectangular slot 50 extends inward from a second end 54 and a bottom surface 56 of the block 44. Rails 58 extend upward from the horizontal surface 46 into the slot 50 and are spaced slightly apart from sides 60 of the slot. This arrangement confines the block 44 to freely move on the flat horizontal surface 46 only in the linear direction D. The indicating means is illustrated as a linear scale 64 located on the horizontal surface 46 alongside a side face 66 of the block 44. An indicating linear mark 68 is disposed on the side face 66 and aligned with the linear scale 64 to measure a maximum linear distance DM the block traversed due to the recoil from a single hit of the laser beam 102 illustrated in FIG. 3 for the previous embodiment of the apparatus of the present invention illustrated in FIGS. 1 and 2.

Figure 6:
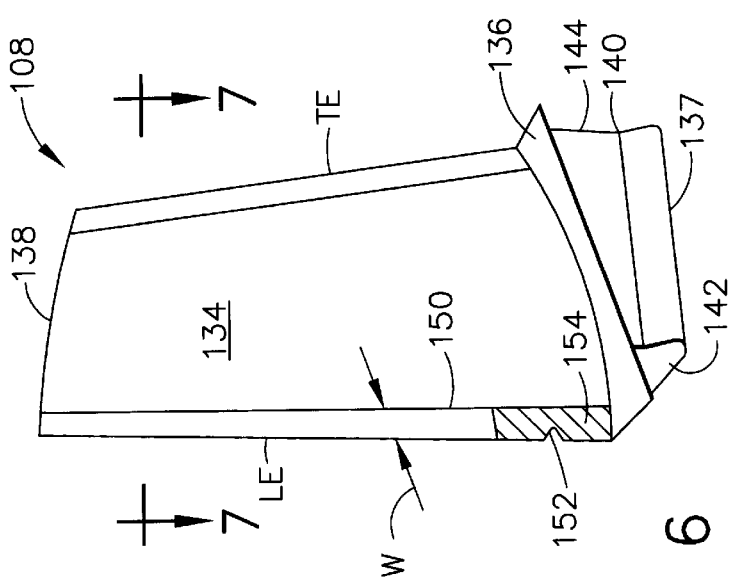
FIG. 6 is a perspective view of a fan blade exemplifying a workpiece for which the ballistic momentum apparatus of the present invention may be used in a quality assurance inspection.
Figure 7:
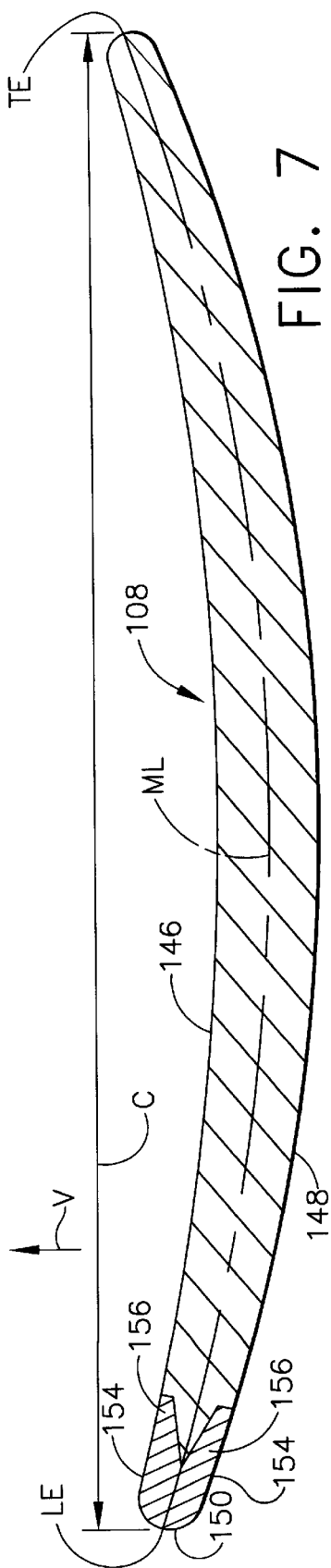
FIG. 7 is a cross-sectional view of the processed fan blade in FIG. 6.

Quality assurance is typically a go or no go, pass or fail, accept or reject type of analysis. The technique of the present invention involves quality assurance of the laser shock peening process on a production workpiece such as an exemplary aircraft turbofan gas turbine engine fan blade 108 illustrated in FIGS. 6 and 7. The fan blade 108 includes an airfoil 134 extending radially outward from a blade platform 136 to a blade tip 138. The fan blade 108 includes a root section 140 extending radially inward from the platform 136 to a radially inner end 137 of the root section 140. At the radially inner end 137 of the root section 140 is a blade root 142 which is connected to the platform 136 by a blade shank 144. The airfoil 134 extends in the chordwise direction between a leading edge LE and a trailing edge TE of the airfoil. A chord C of the airfoil 134 is the line between the leading edge LE and trailing edge TE at each cross-section of the blade as illustrated in FIG. 7. A pressure side 146 of the airfoil 134 faces in the general direction of rotation as indicated by an arrow V and a suction side 148 is on the other side of the airfoil and a mean-line ML is generally disposed midway between the two sides in the chordwise direction.

The fan blade 108 has a leading edge section 150 that extends along the leading edge LE of the airfoil 134 from the blade platform 136 to the blade tip 138. The leading edge section 150 includes a predetermined first width W such that the leading edge section 150 encompasses an area where nicks and tears that may occur along the leading edge of the airfoil 134 during engine operation. The airfoil 134 subject to a significant tensile stress field due to centrifugal forces generated by the fan blade 108 rotating during engine operation. The airfoil 134 is also subject to vibrations generated during engine operation and the nicks and tears operate as high cycle fatigue stress risers producing additional stress concentrations around them.

To counter fatigue failure of portions of the blade along possible crack lines that can develop and emanate from the nicks and tears at least one and preferably both of the pressure side 146 and the suction side 148 have laser shock peened blade surfaces 154 and a pre-stressed blade region 156 having deep compressive residual stresses imparted by laser shock peening (LSP) extending into the airfoil 134 from the laser shock peened surfaces as seen in FIG. 7. The pre-stressed blade regions 156 are illustrated along only a portion of the leading edge section 150 but may extend along the entire leading edge LE or longer portion thereof. The blade 108 is laser shock peened in the laser shock peening system 101 by continuously moving the blade while continuously firing the stationary laser beams 102 through the curtain of flowing water 121 on coated surfaces of the airfoil and forming the laser shock peened blade surfaces 154 pre-stressed blade regions 156 during production and HCF testing and correlation.

One particular embodiment of the present invention includes a correlation between a maximum traversal distance, such as the maximum angular distance θM or the maximum linear distance DM, and a predetermined failure mode of the production type of workpiece such as the blade 108. One correlation for the example presented herein is between the maximum angular distance θM and high cycle fatigue (HCF) of the blades 108 which are laser shock peened and notched before the HCF testing may be used to establish pass/fail criteria. A number of blades 108 or just one blade 108 may be notched and subjected to high cycle fatigue tests to establish the correlation. For each test, one laser shock peened blade 108 has a notch 152 placed in the leading edge LE about a predetermined position of the pre-stressed blade regions 156 after the blade is laser shock peened. The laser target face 20 is preferably hit with a single laser beam burst after and perhaps also before the blade 108 is laser shock peened and the maximum angular distance θM is recorded. After blade 108 is laser shock peened and notched the blade is vibrated at high frequencies until it fails under HCF. The predetermined position of the notch 152 along the leading edge LE should correspond to where the blade fails under HCF during a resonant mode of failure of most concern to the blade designers such as the first, second or third resonant mode. If the blade does not fail within predetermined testing parameters or conditions, then, the maximum angular distance θM measured with respect failed blade is an acceptable level for production and if it fails then it is not. Other laser shock peened blades and associated ballistic momentum apparatus may also be similarly tested using varying laser shock peening parameters to establish bands of acceptable and unacceptable values for the maximum traversal distance. These results can then be used during production runs to qualify the laser shock peening process. It is contemplated that one calibration can be used for an entire production run as long as the production laser shock peening parameters do not change.

While the preferred embodiment of the present invention has been described fully in order to explain its principles, it is understood that various modifications or alterations may be made to the preferred embodiment without departing from the scope of the invention as set forth in the appended claims.

What is claimed is:

1. A ballistic momentum apparatus for maintaining quality control of a laser shock peening process that uses a laser, said apparatus comprising:
   a movable target mass target confined to freely move in one direction,
   a laser target face on said target mass, and
   an indicating means to indicate a distance traversed in said one direction by said target mass during a recoil from firing of the laser on said target face.

2. An apparatus as claimed in claim 1 further comprising a support from which said movable target mass is suspended by a suspension that allows said target mass to freely move along an arc against gravity and wherein said one direction is a circular direction.

3. An apparatus as claimed in claim 2 further comprising an ablative coating on at least a portion of said face.

4. An apparatus as claimed in claim 3 further comprising a transparent confinement medium applied over said ablative coating.

5. An apparatus as claimed in claim 4 wherein said transparent confinement medium is a transparent liquid curtain.

6. An apparatus as claimed in claim 5 wherein said ablative coating is a black plastic tape.

7. An apparatus as claimed in claim 2 wherein:
   said suspension comprises a free swinging suspension arm pivotably attached to said support at a top end of said suspension arm,
   said target mass is a free swinging bob attached to a bottom end of said suspension arm, and
   said arm is free to move in an angular direction.

8. An apparatus as claimed in claim 7 wherein:
   said indicating means comprises a follower arm,
   said follower arm is pivotably suspended from said support, and
   said follower arm is engageable by said suspension arm only in an upward angular direction of said suspension arm and said target mass from a target mass bottom resting angular position to a target mass upper angular position.

9. An apparatus as claimed in claim 8 wherein said indicating means comprises an angular scale operably located to measure a maximum angular position of said follower arm.

10. An apparatus as claimed in claim 9 wherein said follower arm is pivotably connected to said support with a clutch bearing that causes said follower arm to engage said suspension arm only when said suspension arm moves in said upward angular direction and disengage from said suspension arm to remain stationary when said suspension arm moves in a downward angular direction.

11. An apparatus as claimed in claim 10 further comprising an ablative coating on at least a portion of said face.

12. An apparatus as claimed in claim 11 further comprising a transparent confinement medium applied over said ablative coating.

13. An apparatus as claimed in claim 12 wherein said transparent confinement medium is a transparent liquid curtain.

14. An apparatus as claimed in claim 12 wherein said ablative coating is a black plastic tape.

15. An apparatus as claimed in claim 1 wherein said one direction is linear said movable target mass is confined to freely move on a flat horizontal surface in said linear direction.

16. An apparatus as claimed in claim 1 further comprising an ablative coating on at least a portion of said face and a transparent confinement medium applied over said ablative coating.

17. A quality control method for a laser shock peening process, said method comprising the following steps:
   mounting a ballistic momentum apparatus in a laser shock peening system used for the laser shock peening process;
   the ballistic momentum apparatus having a target mass confined to move freely in only one direction and a laser target face on said target mass;
   striking the face of a target mass of the ballistic momentum apparatus with a laser of the laser shock peening system causing the mass to move through a maximum distance in the one direction;
   recording the maximum distance.

18. A method as claimed in claim 17 further comprising a step of comparing the recorded maximum distance to a predetermined correlation of a maximum distance indicating parameter and high cycle fatigue failure of a high cycle fatigue test workpiece related to production workpieces undergoing the laser shock peening process.

19. A method as claimed in claim 18 wherein said correlation is obtained by comparing results of at least one test firing laser on the mass near in time to a laser shock peening of at least one test workpiece and then performing high cycle fatigue testing on the test workpiece after it has been laser shock peened.

20. A method as claimed in claim 19 wherein the production workpieces are gas turbine engine blades having airfoils and the test workpiece is a gas turbine engine blade having an airfoil with a notch in a laser shock peened patch of the airfoil wherein the notch is formed after the airfoil has been laser shock peened.

* * * * *